United States Patent [19]

Altenheiner et al.

[11] Patent Number: 5,189,924
[45] Date of Patent: Mar. 2, 1993

[54] CONTROL BOX MOUNTED INSIDE A HOUSING TO ACTUATE CABLES, RODS AND THE LIKE

[75] Inventors: Klaus Altenheiner, Ehringshausen-Katzenfurt; Werner Lasse, Ehringshausen-Kölschhausen, both of Fed. Rep. of Germany

[73] Assignee: Meflex Telecontrol GmbH & Co., Ehringshausen, Fed. Rep. of Germany

[21] Appl. No.: 710,034

[22] Filed: May 22, 1991

[30] Foreign Application Priority Data

May 25, 1990 [DE] Fed. Rep. of Germany ....... 4016977

[51] Int. Cl.⁵ ............................................. B60K 20/00
[52] U.S. Cl. ................................ 74/473 R; 200/61.88
[58] Field of Search ........................... 74/335, 473 R; 200/61-88

[56] References Cited

U.S. PATENT DOCUMENTS

| | | | |
|---|---|---|---|
| 3,793,901 | 2/1974 | Muller et al. | 74/473 R |
| 4,022,078 | 5/1977 | Malott | 74/475 |
| 4,519,266 | 5/1985 | Reinecke | 74/471 XY |
| 4,570,765 | 2/1986 | Makita | 200/61.88 X |
| 4,745,822 | 5/1988 | Trachman et al. | 74/473 R |
| 4,987,792 | 1/1991 | Mueller et al. | 74/473 R |
| 5,015,807 | 5/1991 | Ishizuki et al. | 200/61.88 |

FOREIGN PATENT DOCUMENTS

| | | |
|---|---|---|
| 0075693 | 4/1983 | European Pat. Off. . |
| 1958146 | 6/1973 | Fed. Rep. of Germany . |
| 1119587 | 7/1968 | United Kingdom . |

*Primary Examiner*—Dirk Wright
*Attorney, Agent, or Firm*—Longacre & White

[57] ABSTRACT

The invention concerns a control box mounted inside a housing and for the purpose of displacing control cables characterized in that a control disk intergral with a lever is seated in pivoting and tipping manner on a hollow shaft in turn resting on an arbor. This control disk and a switch plate are connected in geometrically locking manner with the hollow shaft to achieve joint rotation. A disk linked to the control cable is rigidly joined to the hollow shaft. By means of these an other components, a plurality of functions can be activated or deactivated in a transmission means being controlled. Within the scope of the basic concept of the invention, the control disk, the switch plate, the snap-in bar etc. may be easily matched to a plurality of special requirements, whereby a universally applicable control box is provided.

14 Claims, 4 Drawing Sheets

CONTROL BOX MOUNTED INSIDE A HOUSING TO ACTUATE CABLES, RODS AND THE LIKE

BACKGROUND OF THE INVENTION

1. Field of the Invention

This invention relates to a control system for controlling a spatially remote transmission mechanism by a cable means, a rod or the like.

2. The Description of the Prior Art

Control systems of this type often take the form of gear-rack drives, belt drives or simple lever drives wherein an adjustment of a controlled device is carried out using a lever. Within such lever drives, a first lever which is adapted to be manipulated by an operator transmits the adjustment to a second lever, with the second lever being attached to a cable or a rod.

However, the control boxes of many of these transmission mechanisms are required to control several functions. For example, in road-building vibrating roll vehicles, frequently a vibration switch must be turned ON and then be turned OFF while controlling a travel motion of the vehicle, and safety ranges must be taken into account inside which such vibrations may not yet be turned ON or else already must have been turned OFF.

Such control boxes should be able to control as many functions as possible while nevertheless keeping the size of the control boxes within admissible limits.

SUMMARY OF THE INVENTION

The object of the invention is to have a compact control system which performs several functions.

This invention concerns a control box, mounted in a housing, in which the control box moves control cables, rods, and the like to control at least one function in a spatially remote transmission or other apparatus. The control box is comprised of a lever pivotable about a fixed arbor and a snap-in means defining at least one lever position. The lever of the invention is integral with a control disk which is connected thereto in a positive geometrically-locking manner.

The control box is comprised of a housing, a lever, a snap-in means to define at least one lever position and a control stud. The lever is pivotable about a fixed arbor and is integral with a control disk. The control disk is connected in a positive geometrically locking manner to a rotatable shaft for rotation therewith, with the shaft being integral with a fixed disk linked to cables, rods or the like. The control disk together with the lever can be tipped on the shaft perpendicularly to the direction of adjustment of the lever. The control stud cooperates with the snap-in bar.

A switch plate is connected to the shaft for joint rotation. The switch plate is comprised of at least one switch extension cooperating with at least one inductive proximity switch, wherein at least one transmission function is electrically controlled. A second proximity switch is activated by the control stud of the control disk when the disk is tipped by the lever from the middle rest snap-in position. The switch plate can also be further comprised of two switch extensions mounted symmetrically in a rest (snap-in) position such that the pivoting motion of the lever from a middle rest position will actuate the proximity switch nearest to the switch extension.

The shaft may also contain two axially loading springs holding between them the control disk in a middle position perpendicular to the shaft. The axial springs themselves may consist of two equal sets of cup springs.

The control disk may also be further comprised of two stops symmetrical to the rest (snap-in) position which in cooperation with the end stops define the pivot angle of the lever.

The snap-in means may be comprised of a laterally grooved bar mounted in an exchangeable manner in the housing, and which is engaged by a control stud. The bar may be affixed by screws which are provided with lock nuts which can be screwed in at variable depths, with the heads of the screws serving as end-stops for the stop surfaces of the control disk.

In yet another preferred embodiment of the invention, the fixed disk is further comprised of angularly offset holes to link a control cable. The housing is provided with several matching apertures through which to pass the control cable.

The housing may also be comprised of an adjustable clamping system for the fixed disk, with the clamping system being comprised of two clamping jaws with at least one spring acting on at least one clamping jaw with an externally adjustable screw to adjust the pressure exerted by at least one spring, wherein the fixed disk is positioned between the clamping jaw.

In yet another embodiment of the invention, the shaft connected with the control disk in a positive geometrically locking manner is a hollow shaft resting on the arbor stationary in the housing. The geometric locking is achieved by having two milled surfaces in the hollow shaft. The control disk is plugged onto the surfaces by means of suitable holes through the control disk and milled surfaces. More specifically, the hollow shaft is comprised of one hole on each of its opposite sides, each receiving a ball jointly holding the control disk centrally relative to the fixed arbor and serving as tipping points when the control disk is being tipped.

DETAILED DESCRIPTION OF THE PREFERRED EMBODIMENT

Figure 1:
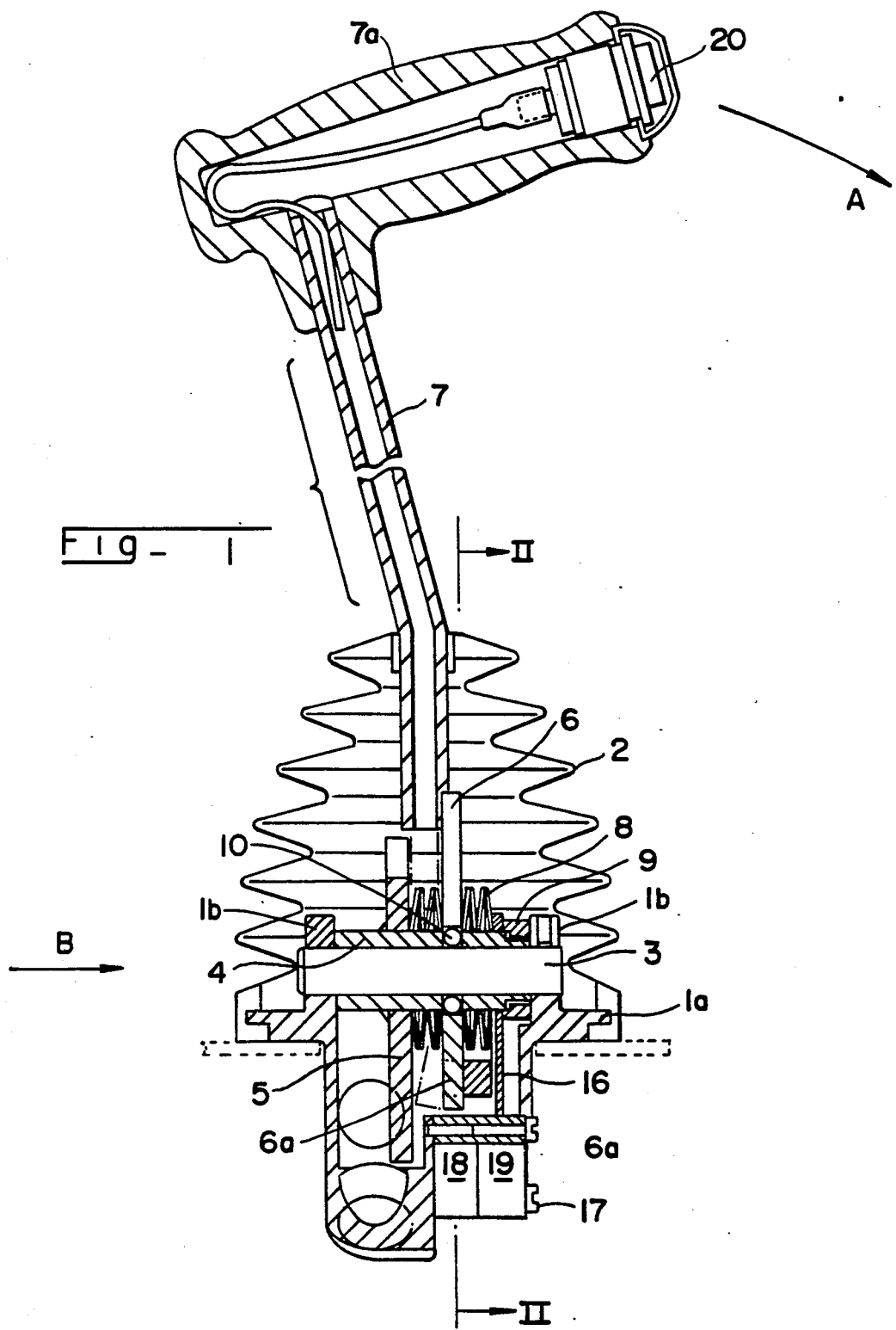
FIG. 1 is a longitudinal sectional view of the control system of the invention.

In the Figures, 1 denotes the housing of the control system, with the housing essentially consisting of a rectangular receptacle with a peripheral collar 1a at the upper edge. The housing is upwardly open and, together with the transmission components contained in it, is enclosed by a bellows 2.

Two integrated eyes 1b are present at the top of the housing 1 and rigidly hold an arbor 3. A hollow shaft 4 to which is rigidly joined an actuating disk 5 engaged by the displaceable cable or the rod rotates on the fixed arbor 3.

The disk comprises prepared linkage holes 21a and the housing comprises several matching apertures 21 through which the control cable is adapted to pass.

These various holes and apertures are provided so that the control cable can be led away at different angles from the control box.

Figure 2:
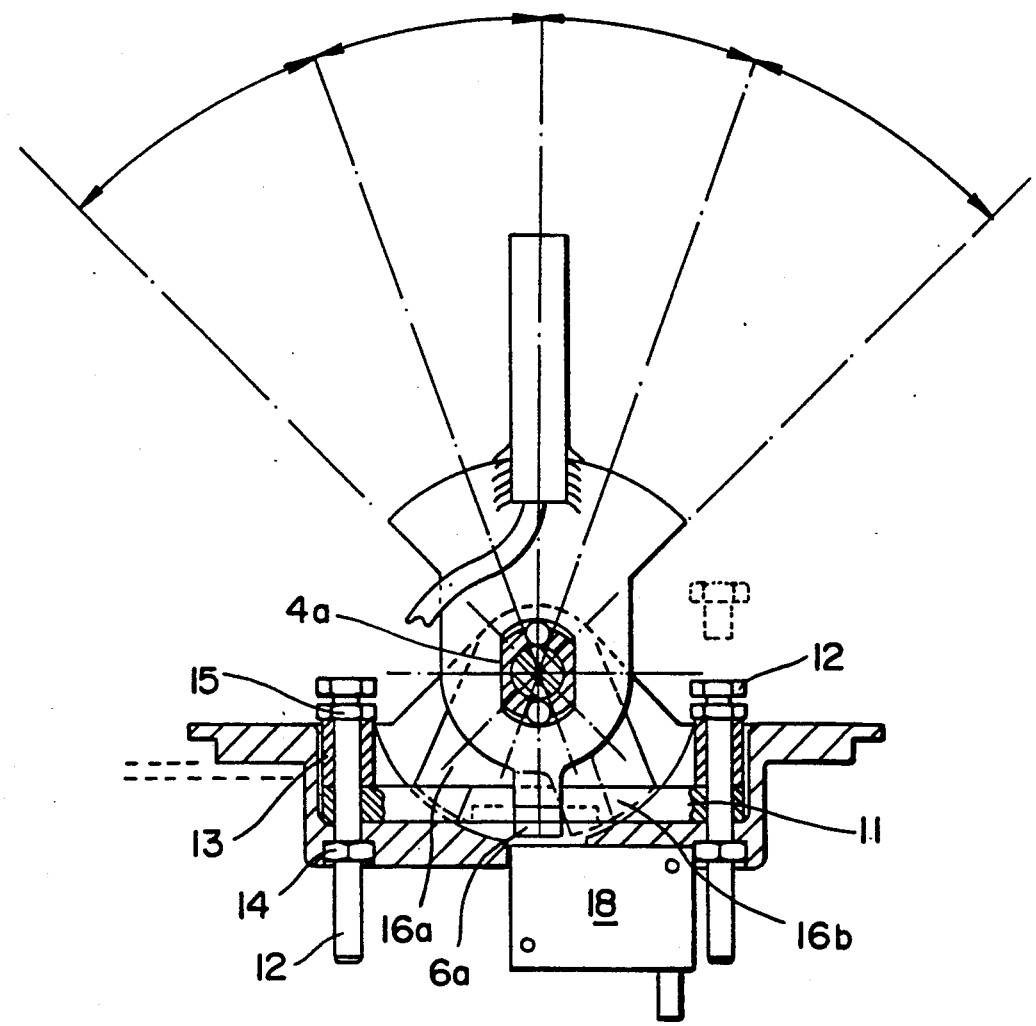
FIG. 2 is a sectional view of the control system along lines 2—2 of FIG. 1.
Figure 3:
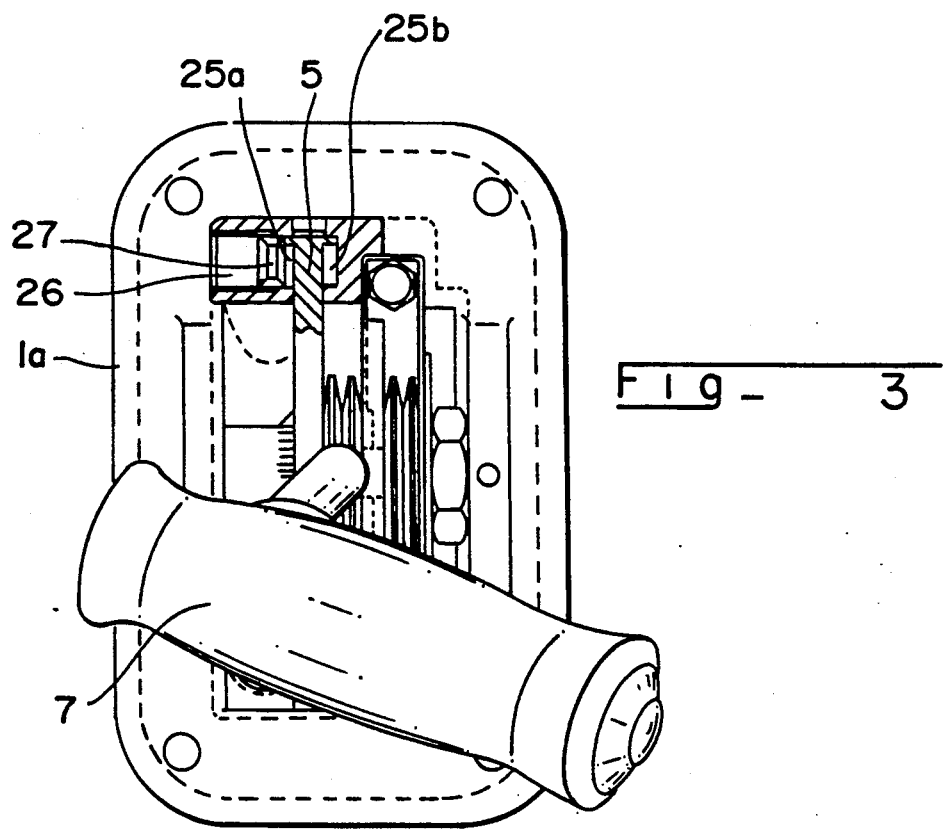
FIG. 3 is a top view of the control system shown without the bellows of FIG. 1.

Moreover, the hollow shaft 4 comprises two milled surfaces 4a most clearly shown by FIG. 2. A control disk 6 is fitted onto said surfaces and a lever 7 is affixed, for instance by welding, to this disk 6. The control disk 6 and the lever 7 therefore form an integral unit. The control disk 6 is kept vertical by two sets of cup springs 8 resting on one hand against the fixed disk 5 and on the other hand on a nut 9 screwed onto the hollow shaft 4. The control disk 6 can be tipped by means of the lever 7 against the force of these springs in a direction perpendicular to the pivoting direction of this lever 7 about the arbor 3.

For that purpose the hole diameter in the control disk 6 is slightly larger than &he outside diameter of the hollow shaft 4. By means of its hole diameter the control disk 6 rests on two balls 10 in turn supported on opposite sides on the fixed arbor 3 in two boreholes of the hollow shaft 4 (FIG. 2).

Figure 4:
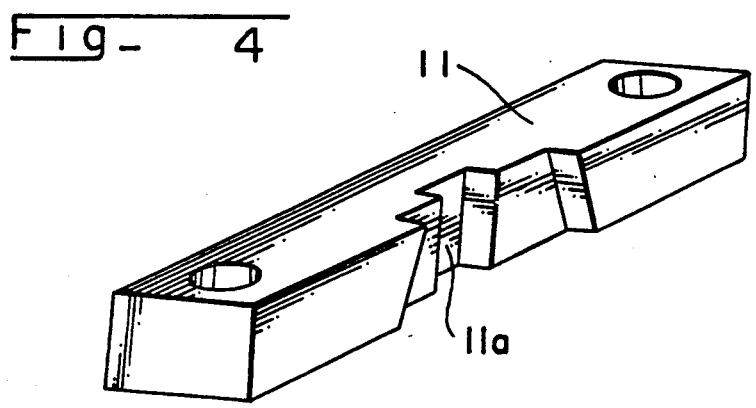
FIG. 4 is a perspective view of the snap-in bar of the control system of FIG. 1.
Figure 5:
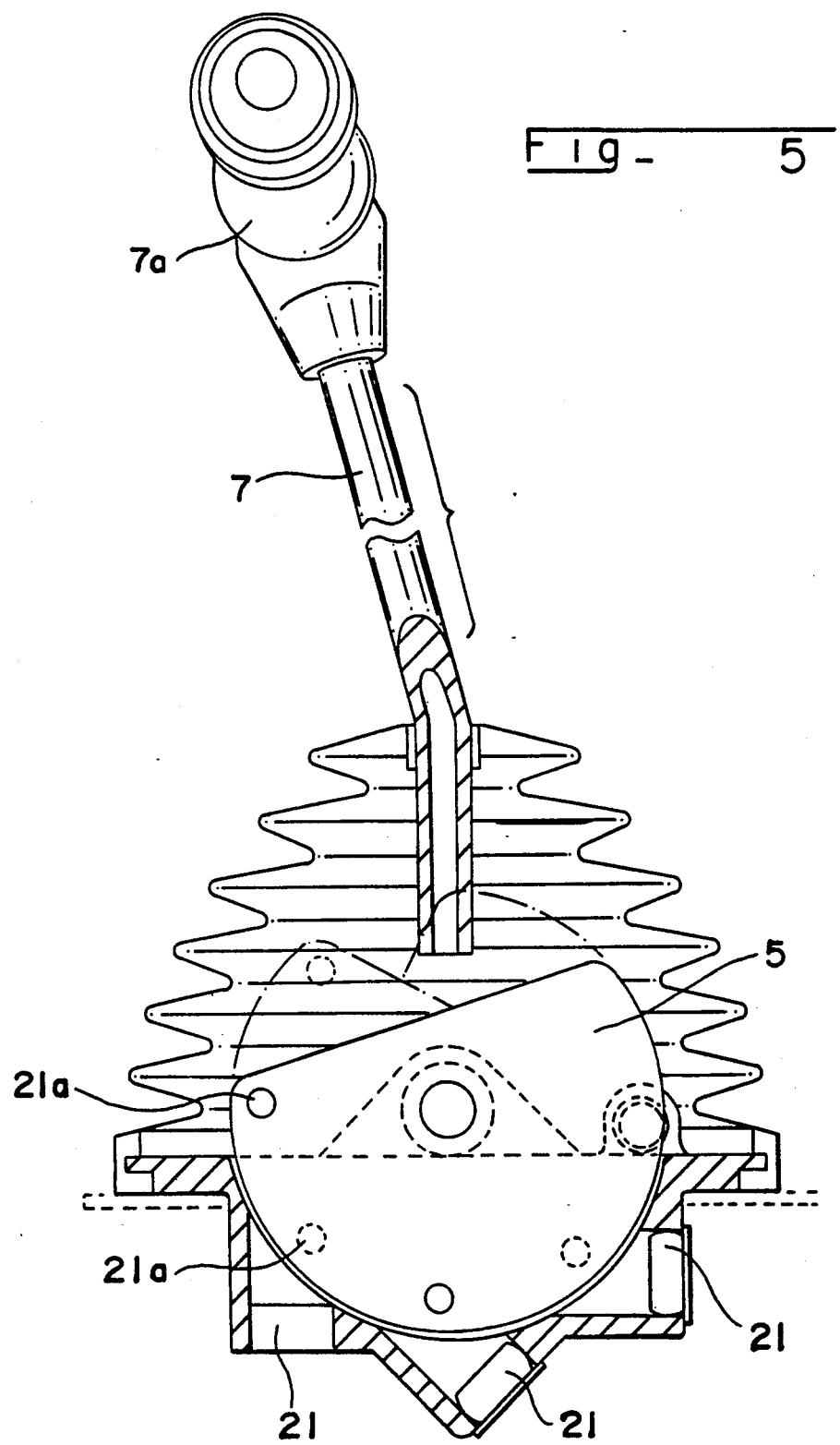
FIG. 5 is a partial sectional view of the control system in the direction of the arrow B of FIG. 1.

The control disk 6 comprises on its side opposite the lever 7 a control stud 6a cooperating with a snap-in bar 11. FIG. 4 shows the outer shape of this snap-in bar which comprises a clearance 11a inside which—in the rest position—the control stud 6a is held by the force of the cup springs 8. By tipping the lever 7 in the direction of arrow A (FIG. 1) the control stud 6a can be moved out of the clearance 11a, whereby the lever 7 is free to pivot in either direction about the arbor 3.

The snap-in bar comprises at each of its end a through-hole entered by screws 12. The snap-in bar 11 is kept in position by means of bushes 13.

The screws 12 are long and engage the housing 1 at its bottom by means of nuts 14 while being tightened above by lock nuts 15. As a result the heads of screws 12 may be projected by screwing them in more or less relative to the housing, and together with rest surfaces 6b integrated into the control disk 6 they act as limit means on the pivot angle of the lever 7.

Furthermore, the bushes 13 may be replaced by nuts directly resting on the snap-in bar 11. However, such nuts would be accessible only with difficulty and moreover would require a special tool. Accordingly, the bushes 13 advantageously shift the locking nuts 15 upward and outside the housing where they are easily accessed.

Furthermore, a switch plate 16 with a matching hole is seated in the milled surfaces 4a of the hollow shaft 4 and this switch plate thereby is connected to the hollow shaft 4 so as to rotate together with it. The switch plate evinces the shape indicated by FIG. 2 and comprises two angularly spaced switch extensions 16a, 16b of which the purpose is discussed below.

Two inductive proximity switches 18 and 19 are affixed by screws 17 to the housing underside (FIGS. 1 and 2). Switch 18 is actuated by the control stud 6a, whereas switch 19 is actuated by the switch extensions 16a and 16b.

The control-box function is described as follows in relation to a road-construction machine, i.e. a vibrating roll for road building. However, the control box is not limited to such machinery but is applicable whenever one control box controls several functions of a transmission, equipment or the like, especially when part of such functions can or must be controlled electrically.

The following function relates to the control box of the invention when dealing with a vehicle such as a road-building vibrating roll:

In the position shown in FIGS. 1 and 2, the control stud 6a assumes the snap-in position at the clearance 11a of the snap-in bar. In this neutral position, it is nearer the proximity switch 18 which thereby is activated, i.e. conducting. The starter circuit passes through this switch, as a result of which the engine driving the roll can be energized (or started) only in this middle or rest position of lever 7. If at the end of a work cycle the roll is merely deactivated by the key(s) being pulled out of the ignition switch while the lever 7 is still set on "forward" or "reverse"—with or without vibration—then thereafter the roll cannot be restarted because the proximity switch 18 is interrupting the starter circuit. Therefore, the lever 7 must first be moved back into its middle position wherein the control stud 6a actuates the switch 18. Only in that position, for which the starter circuit is closed but "forward" or "reverse" are disengaged, will it be possible to start the roll. This design therefore provides safety against the roll starting immediately if "forward" or "reverse" are engaged.

After the roll has been properly started, it may be moved forward or backward at varying speed depending on the forward or backward pivoting excursion of the lever 7. The force required to pivot the lever 7 is adjustable. For that purpose an adjustable clamping system for the disk 5 is provided in the housing. This clamping system is composed of two clamping jaws 25a and 25b determining the guidance of the disk 5 and of which the clamping jaw 25a is supported so as to be displaceable perpendicularly to the disk 5. The clamping jaw 25a is loaded by a spring 27 resting on the other side against a screw 26 which can be screwed-in at variable depth perpendicularly to the disk 5. The screw 26 is externally accessible, whereby the clamping by the above system can be varied any time.

The roll-vibration function can be turned ON by depressing a push button switch 20 mounted on the grip 7a of the lever 7. The roll-rate is controlled (e.g. according to vehicle speed) by displacement of the control cable (not shown in further detail) caused by the lever 7 through the fixed disk 5.

When a certain rate has been exceeded however, the vibration must be shut OFF again. This is implemented by means of the switch plate 16 together with the inductive proximity switch 19. If together with the lever 7 the switch plate 16 is also pivoted, then the switch extensions 16a or 16b move into the range of the switch 19 which in turn shuts OFF the vibration.

In this manner a plurality of functions have been combined in a compact control-box of the invention. The control box is easily matched to different conditions and requirements. Illustratively, the snap-in bar 11 is easily exchanged for another designed by its clearances and grooves for an especially desirable pivot angle. Similar consideration apply to the switch plate 16 and the control disk 6 with its stop surfaces 6b.

Although particular embodiments of the present invention have been described and illustrated herein, it should be recognized that modifications and variations may readily occur to those skilled in the art and that such modifications and variation may be made without departing from the spirit and scope of the invention. Consequently, the invention as claimed below may be practiced otherwise than as specifically described above.

What is claimed is:

1. A control box adapted to control at least one function of a mechanical device, comprising:
   a housing;
   an arbor fixed to said housing;
   a shaft rotatably mounted on said arbor;
   a control disk mounted for rotation with said shaft;
   a lever rigidly connected to the control disk;
   a fixed disk integral with said shaft and adapted to be connected to mechanical means for controlling an operation of the mechanical device;
   wherein said lever is pivotable about an axis of rotation of said shaft in a first direction which effects an adjustment of said mechanical device, and wherein said control box further comprises means for permitting said lever to be tipped relative to said shaft in a second direction perpendicular to the first direction to effect an electrical control of at least one function of the mechanical device; and
   further comprising adjustable clamping means for adjustably frictionally clamping said fixed disk against free rotation.

2. The control box according to claim 1, comprising axially loading spring means for resiliently sandwiching the control disk and for holding the control disk perpendicular to said shaft in a middle position on said shaft.

3. The control box according to claim 2, wherein said axial loading spring means consist of two equal sets of cup springs.

4. The control box according to claim 1, wherein said fixed disk comprises multiple mutually angularly offset holes adapted to link a control cable therein and wherein said housing is provided with several matching apertures which are adapted to receive said control cable.

5. A control box as recited in claim 1, wherein the control disk is connected to the shaft in a geometrically locking manner which establishes joint rotation between the control disk and the shaft but which allows the control disk to pivot relative to said shaft.

6. A control box as recited in claim 1, wherein the electrical control of the at least one function of the mechanical device is effected through a proximity switch mounted on said housing which senses a position of a portion of the control disk relative to said housing.

7. A control box as recited in claim 1, wherein a switch plate is rotatably connected with said shaft and wherein the electrical control of the at least one function of the mechanical device is effected through a proximity switch mounted on said housing which senses a position of an extension of the switch plate relative to the housing.

8. A control box adapted to control at least one function of a mechanical device, comprising:
   a housing;
   an arbor fixed to said housing;
   a shaft rotatably mounted on said arbor;
   a control disk mounted for rotation with said shaft;
   a lever rigidly connected to the control disk;
   a fixed disk integral with said shaft and adapted to be connected to mechanical means for controlling an operation of the mechanical device;
   wherein said lever is pivotable about an axis of rotation of said shaft in a first direction which effects an adjustment of said mechanical device, and wherein said control box further comprises means for permitting said lever to be tipped relative to said shaft in a second direction perpendicular to the first direction to effect an electrical control of at least one function of the mechanical device; and
   wherein said lever is connected to said control disk at one side of the axis of rotation of said shaft, and said control disk is provided, at the other side of the axis of rotation, with a control stud, wherein the control stud cooperates with a snap-in bar rigidly connected to the housing to establish a neutral snap-in position for said lever when said control stud occupies a recess provided in said snap-in bar.

9. The control box according to claim 2, further comprising a switch plate connected to said shaft for joint rotation therewith, said switch plate comprising at least one switch extension cooperating with at least one inductive proximity switch mounted on said housing, wherein said at least one function is electrically controlled via said at least one proximity switch.

10. The control box according to claim 9 further comprising a second proximity switch wherein said second proximity switch is switched by the control stud of the control disk when said disk is tipped by said lever from the neutral snap-in position.

11. The control box according to claim 10 wherein said switch plate comprises two switch extensions and wherein the pivoting motion of the lever from a middle rest position will cause one of the two switch extensions to actuate the second proximity switch.

12. A control box adapted to control at least one function of a mechanical device, comprising:
   a housing;
   an arbor fixed to said housing;
   a shaft rotatably mounted on said arbor;
   a control disk mounted for rotation with said shaft;
   a lever rigidly connected to the control disk;
   a fixed disk integral with said shaft and adapted to be connected to mechanical means for controlling an operation of the mechanical device;
   wherein said lever is pivotable about an axis of rotation of said shaft in a first direction which effects an adjustment of said mechanical device, and wherein said control box further comprises means for permitting said lever to be tipped relative to said shaft in a second direction perpendicular to the first direction to effect an electrical control of at least one function of the mechanical device; and
   wherein said control disk defines two stop surfaces which, in cooperation with end-stops provided on said housing, define the pivot angle of the lever.

13. The control box according to claim 12, further comprising snap-in means for defining a neutral position for said lever, said snap-in means comprising a bar, said bar including a lateral groove, said groove being engaged by a control stud provided on said control disk when the lever is in the neutral position, wherein said bar is removably mounted in said housing.

14. The control box according to claim 13, wherein said bar is affixed by screws which are provided with lock nuts and which can be screwed-in at variable depths, said heads of said screws serving as end-stops for the stop surfaces of said control disk.

* * * * *